US007966812B2

(12) United States Patent
Xu et al.

(10) Patent No.: US 7,966,812 B2
(45) Date of Patent: Jun. 28, 2011

(54) MULTI-STAGE REGENERATION OF PARTICULATE FILTER

(75) Inventors: Lifeng Xu, Farmington Hills, MI (US); William Lewis Henderson Watkins, Toledo, OH (US); William Charles Ruona, Farmington Hills, MI (US); George Wade Graham, Ann Arbor, MI (US); Robert Walter McCabe, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 972 days.

(21) Appl. No.: 11/847,148

(22) Filed: Aug. 29, 2007

(65) Prior Publication Data

US 2009/0056310 A1    Mar. 5, 2009

(51) Int. Cl.
*F01N 3/00* (2006.01)
*F01N 3/10* (2006.01)
(52) U.S. Cl. ............... 60/295; 60/274; 60/297; 60/301; 60/303
(58) Field of Classification Search .................. 60/273, 60/284, 286, 295, 297, 300, 301, 303, 274
See application file for complete search history.

(56) References Cited

U.S. PATENT DOCUMENTS

| | | | |
|---|---|---|---|
| 5,431,893 A | 7/1995 | Hug et al. | |
| 5,711,149 A | 1/1998 | Araki | |
| 5,976,475 A | 11/1999 | Peter-Hoblyn et al. | |
| 6,203,770 B1 | 3/2001 | Peter-Hoblyn et al. | |
| 6,209,313 B1 | 4/2001 | Wissler et al. | |
| 6,209,317 B1 | 4/2001 | Hirota | |
| 6,810,660 B2 | 11/2004 | Hepburn et al. | |
| 6,823,660 B2 | 11/2004 | Minami | |
| 6,871,489 B2 | 3/2005 | Tumati et al. | |
| 6,871,490 B2 | 3/2005 | Liang et al. | |
| 6,892,530 B2 | 5/2005 | Montreuil et al. | |
| 6,928,506 B2 | 8/2005 | Czech et al. | |
| 2004/0098973 A1 | 5/2004 | Tennison et al. | |
| 2004/0098979 A1* | 5/2004 | Hammerle et al. | 60/295 |
| 2004/0206069 A1 | 10/2004 | Tumati et al. | |
| 2007/0000520 A1 | 1/2007 | Steen et al. | |
| 2007/0068141 A1 | 3/2007 | Opris et al. | |
| 2007/0199312 A1* | 8/2007 | Kapparos et al. | 60/297 |

FOREIGN PATENT DOCUMENTS

| | | |
|---|---|---|
| EP | 0196421 | 10/1986 |
| WO | 9822209 | 5/1998 |
| WO | 2004/022935 | 3/2004 |

(Continued)

OTHER PUBLICATIONS

Summary of the Properties and Uses of Hydrocarbons, archived Jun. 17, 2002, pp. 1-2.*

(Continued)

*Primary Examiner* — Thomas E Denion
*Assistant Examiner* — Audrey Klasterka
(74) *Attorney, Agent, or Firm* — Julia Voutyras; Alleman Hall McCoy Russell & Tuttle LLP

(57) ABSTRACT

A method of regenerating a particulate filter utilizes two temperature levels, with the first, lower, level removing stored hydrocarbons and urea from an SCR catalyst. The second, higher, level then follows for filter regeneration. Because the regeneration occurs after the SCR catalyst has been purged of hydrocarbons and urea, for example, the temperature experienced by the SCR catalyst during regeneration is reduced. In this way, SCR degradation may be reduced.

9 Claims, 6 Drawing Sheets

| | FOREIGN PATENT DOCUMENTS | |
|---|---|---|
| WO | 2006021748 | 3/2006 |
| WO | 2006126922 | 11/2006 |
| WO | WO 2007145548 A1 * | 12/2007 |
| WO | 2008/054632 | 5/2008 |

OTHER PUBLICATIONS

United Kingdom, Intellectual Property Office, Search Report of GB0814862.9, Dec. 5, 2008.

* cited by examiner

MULTI-STAGE REGENERATION OF PARTICULATE FILTER

TECHNICAL FIELD

The present application relates to the regeneration of an emission system particulate filter.

BACKGROUND

Engines that operate under lean conditions and high compression ratios, including but not limited to diesel engines, provide the benefit of high fuel economy over conventional gasoline engines. Aftertreatment systems for such engines may include a particulate filter for trapping particulate matter in the engine emissions, and also may include a selective catalytic reduction (SCR) system for treating nitrogen oxide (NOx) emissions.

One type of SCR system utilizes a catalyst and an injector for injecting an aqueous urea solution into the exhaust stream upstream of the catalyst. The urea decomposes into ammonia, which acts as a reductant for NOx reduction at the catalyst. Ammonia is generated from urea largely by the following two reaction steps.

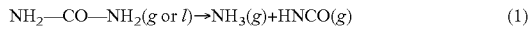

(1)

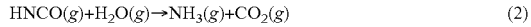

(2)

Reaction (1) is a thermal decomposition reaction, and reaction (2) is a hydrolysis reaction. The thermal decomposition of urea is slow at lower exhaust temperatures, and tends to be the rate limiting step, especially at temperatures below 300° C. Therefore, the spray of urea solution into the diesel exhaust system may result in the accumulation of deposits of urea on the SCR catalyst before the urea decomposes if the exhaust temperature is below 300° C.

To ensure proper particulate filter performance, a particulate filter may be regenerated periodically by increasing exhaust temperatures to 550-650° C. to burn off accumulated particulate matter. Since both the SCR catalyst and the particulate filter are located along the exhaust system, the SCR catalyst may also be heated to the particulate regeneration temperatures during particulate filter regeneration. This may cause urea deposits in the SCR catalyst to decompose at a high rate when the catalyst is heated, which may heat the SCR catalyst to undesirably high temperatures.

Further, unburnt and/or partially burnt hydrocarbons, including but not limited to large size hydrocarbons such as those in diesel fuel, in the exhaust gas may be stored in the SCR catalyst and be oxidized quickly to heat the SCR catalyst to undesirably high temperatures during particulate filter regeneration.

The inventors herein have realized that such issues may be addressed by regenerating the particulate filter by exposing a catalyst and particulate filter to a first, lower elevated exhaust temperature to remove urea deposits and stored hydrocarbon from the catalyst, and then exposing the catalyst and particulate filter to a second, higher elevated exhaust temperature to heat the particulate filter to decompose particulate matter in the particulate filter. In this manner, damage caused to the catalyst due to the decomposition and derived reactions of urea deposits and oxidation of stored hydrocarbon during particulate filter regeneration may be avoided.

DETAILED DESCRIPTION OF THE DEPICTED EMBODIMENTS

Figure 1:
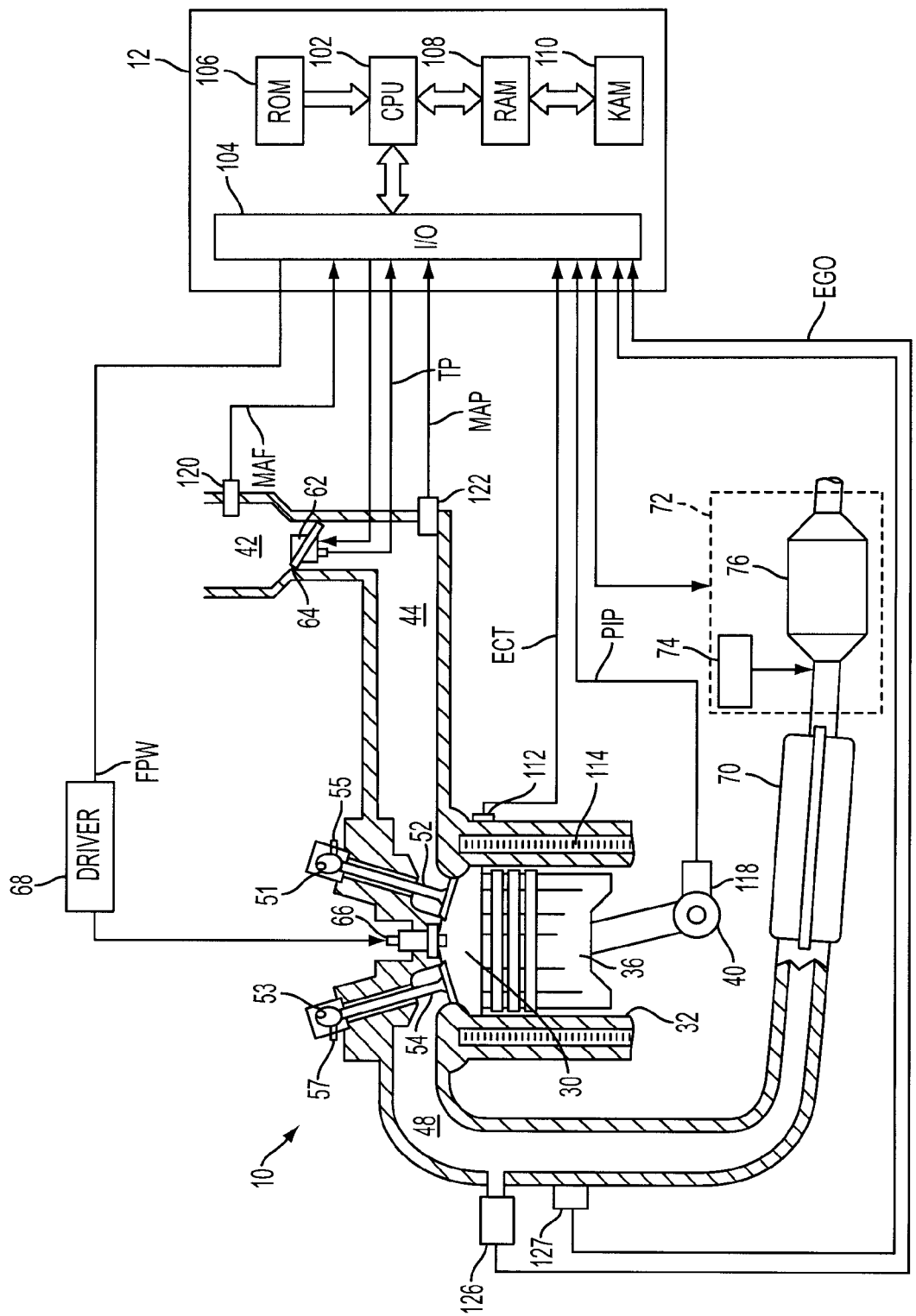
FIG. 1 shows an embodiment of an internal combustion engine system.

Before describing the disclosed embodiments of the regeneration of a particulate filter, one example of a use environment is described. Referring to FIG. 1, direct injection internal combustion engine 10, comprising a plurality of combustion chambers (one of which is shown at 30) and controlled by electronic engine controller 12, is shown. Combustion chamber 30 of engine 10 includes combustion chamber walls 32 with piston 36 positioned therein and connected to crankshaft 40. In one example, piston 36 includes a recess or bowl (not shown) to form selected levels of stratification or homogenization of charges of air and fuel. Alternatively, a flat piston may also be used.

Combustion chamber 30 is shown communicating with intake manifold 44 and exhaust manifold 48 via intake valve 52 and exhaust valve 54. Fuel injector 66 is shown directly coupled to combustion chamber 30 for delivering liquid fuel directly therein in proportion to the pulse width of signal fpw received from controller 12 via conventional electronic driver 68. Fuel is delivered to fuel system (not shown) including a fuel tank, fuel pumps, and a fuel rail. In some embodiments, engine 10 may include a plurality of combustion chambers each having a plurality of intake and/or exhaust valves.

Intake valve 52 may be controlled by controller 12 via electric valve actuator (EVA) 51. Similarly, exhaust valve 54 may be controlled by controller 12 via EVA 53. During some conditions, controller 12 may vary the signals provided to actuators 51 and 53 to control the opening and closing of the respective intake and exhaust valves. The position of intake valve 52 and exhaust valve 54 may be determined by valve position sensors 55 and 57, respectively. In alternative embodiments, one or more of the intake and exhaust valves may be actuated by one or more cams, and may utilize one or more of cam profile switching (CPS), variable cam timing (VCT), variable valve timing (VVT) and/or variable valve lift (VVL) systems to vary valve operation. For example, combustion chamber 30 may alternatively include an intake valve controlled via electric valve actuation and an exhaust valve controlled via cam actuation including CPS and/or VCT.

Intake manifold 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake manifold 42 may include a mass air flow sensor 120 and a manifold air pressure sensor 122 for providing respective signals MAF and MAP to controller 12.

Controller 12 activates fuel injector 66 so that a desired air-fuel ratio mixture is formed. Controller 12 controls the amount of fuel delivered by fuel injector 66 so that the air-fuel ratio mixture in chamber 30 can be selected to be substantially at (or near) stoichiometry, a value rich of stoichiometry, or a value lean of stoichiometry. Further, controller 12 is configured to activate fuel injector 66 so that multiple fuel injections may be performed during a cycle.

An exhaust manifold gas sensor 126 is shown coupled to exhaust passage 48. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Furthermore, an exhaust gas temperature sensor 127 may provide a signal EGT proportional to an exhaust gas temperature.

A particulate filter 70 and a selective catalytic reduction (SCR) system 72 are shown disposed along exhaust manifold 48. While particulate filter 70 is shown positioned along exhaust manifold 48 upstream (i.e. closer to combustion chamber 30) of SCR system 72, it will be appreciated that particulate filter 70 may also be positioned downstream (i.e. farther from combustion chamber 30) of SCR system 72. Further, other catalytic devices, including but not limited to a diesel oxidation catalyst (not shown), may be positioned along exhaust manifold 48.

SCR system 72 may include a reductant storage device 74 and an SCR catalyst 76. Reductant storage device 74 is configured to store a reductant, such as an aqueous urea solution, for the selective addition of the reactant to the exhaust stream upstream of SCR catalyst 76. This allows the reductant to react with NOx emissions in SCR catalyst 76, thereby reducing the NOx emissions.

Controller 12 is shown in FIG. 1 as a conventional microcomputer including: microprocessor unit 102, input/output ports 104, an electronic storage medium of executing programs and calibration values, shown as read-only memory chip 106 in this particular example, random access memory 108, keep alive memory 110, and a conventional data bus.

Controller 12 is shown receiving various signals from sensors coupled to engine 10, in addition to those signals previously discussed, including: engine coolant temperature (ECT) from temperature sensor 112 coupled to cooling sleeve 114; a profile ignition pickup signal (PIP) from Hall effect sensor 118 coupled to crankshaft 40 giving an indication of engine speed (RPM); throttle position TP from throttle position sensor 120; and absolute Manifold Pressure Signal MAP from sensor 122. Further, controller 12 is configured to control the addition of reductant from reductant storage device 74, and may receive feedback from SCR system 72.

Combustion in engine 10 can be of various types, depending on operating conditions. While engine 10 is described herein in the context of a diesel compression ignition engine, it will be appreciated that the embodiments described below may be used in any suitable engine, including but not limited to, diesel and gasoline compression ignition engines, spark ignition engines, direct or port injection engines, etc. Further, various fuels and/or fuel mixtures such as gasoline, diesel, $H_2$, ethanol, methane, and/or combinations thereof may be used. Further, engine 10 may include additional elements not shown in FIG. 1, such as a turbocharger system having an exhaust turbine and intake compressor, etc.

Figure 2:
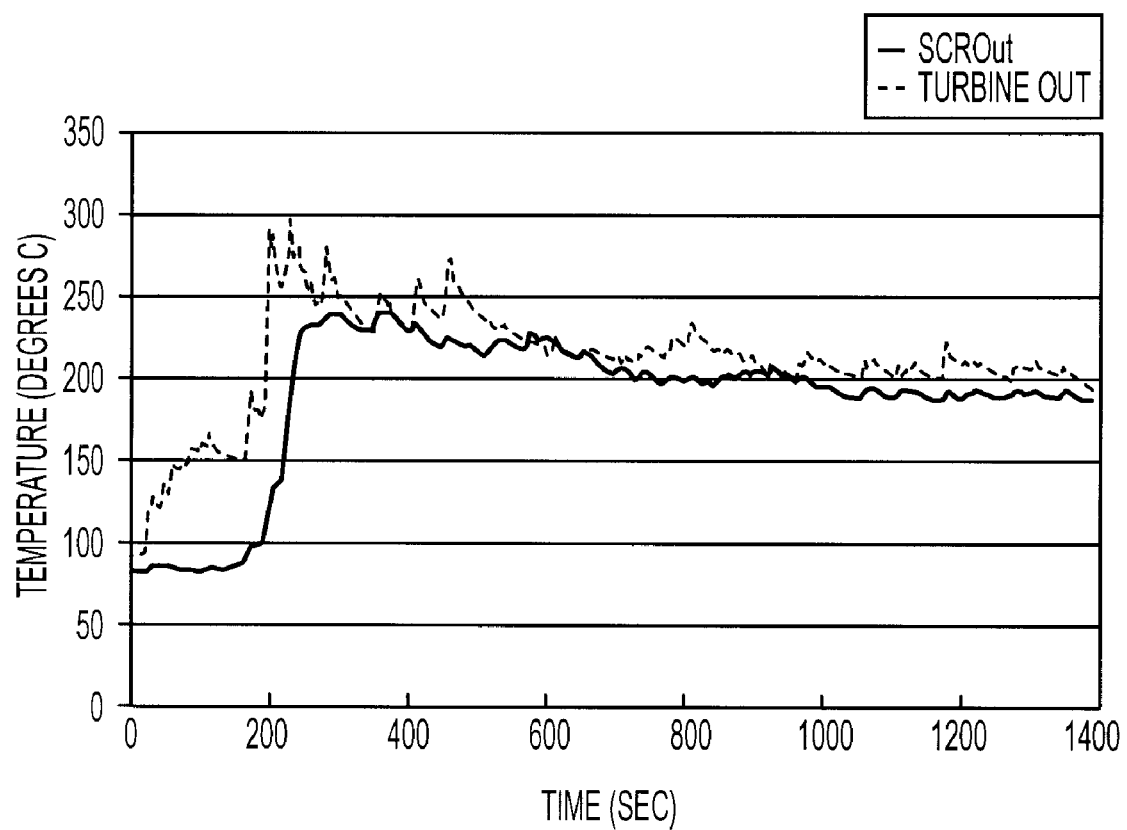
FIG. 2 shows a graph of exhaust temperatures at an outlet of an exhaust turbine and at an outlet of an SCR catalyst as a function of time.

As described above, the decomposition of urea may occur at a relatively low rate when exhaust temperatures are relatively low (for example, below 300° Celsius) due to the rate-limiting step being the thermal decomposition reaction (1) shown above. As a result, urea deposits may build up within SCR catalyst 76 over time. The un-burnt hydrocarbon, especially large hydrocarbon, in the exhaust stream may also accumulate at the SCR catalyst 76. However, diesel exhaust temperature may be low, for example, on the order of 300° Celsius or lower, when a diesel vehicle is driven in urban driving cycles. This may be especially true for light-duty passenger diesel vehicles. FIG. 2 shows a graph of the exhaust temperatures as a function of time at the outlet of a diesel turbine (not shown in FIG. 1) and at the outlet of an SCR catalyst of a 6.4 liter diesel engine during the Federal Test Procedure (FTP) cycle. During ordinary operation, the temperature of the SCR catalyst 76 will be between these two temperatures. Therefore, as shown in FIG. 2, the SCR temperature may be approximately 200° Celsius during such operation. At these temperatures, the thermal decomposition of urea and the oxidation of hydrocarbon may be slow, and urea deposits and hydrocarbon may accumulate in SCR catalyst 76.

Figure 3:
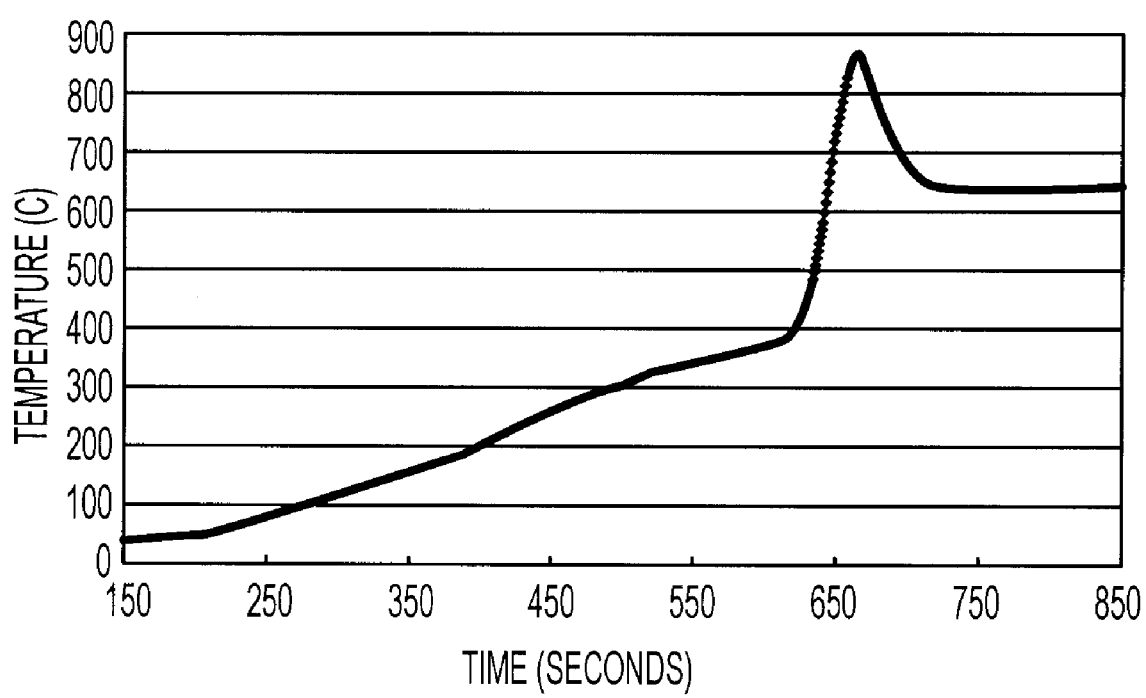
FIG. 3 shows a graph of a temperature of an SCR catalyst as a function of time while heating a particulate filter to a regeneration temperature.
Figure 4:
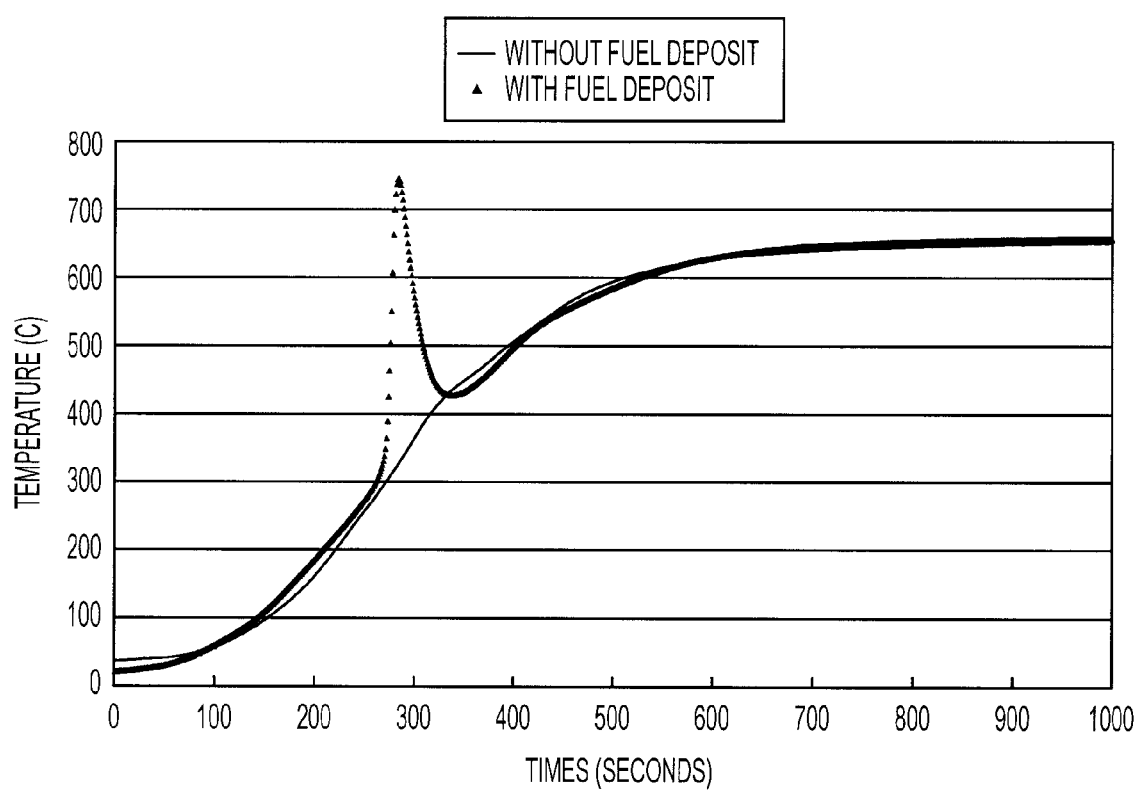
FIG. 4 shows a graph of temperatures of SCR catalysts (with and without diesel fuel stored) as a function of time while heating a particulate filter to a regeneration temperature.

At the elevated exhaust temperatures used for the regeneration of particulate filter 70, urea deposits may rapidly decompose, resulting in other intense reactions, and the stored hydrocarbon may oxidize rapidly. FIGS. 3 and 4 show the temperature profiles of an Fe-zeolite SCR catalyst with a 1.2 gram urea deposit, and with 1.2 gram diesel fuel stored, respectively, during a laboratory-simulated particulate filter regeneration process. The heating rate used in the simulation was approximately 1.2° C./sec. This may be somewhat lower than heating rates encountered in some actual particulate filter regenerations, which may reach 1.5-3.0° C./sec. In FIGS. 3 and 4, it can be seen that a spike in the temperature of the SCR catalyst begins at about 400° C. for urea deposits and at about 350° C. for stored diesel fuel. The catalyst temperatures thus extend to temperatures much higher than those used during particulate filter regeneration. From FIGS. 3 & 4, it appears that the high heating rates used in particulate filter regeneration may not allow urea deposits and stored hydrocarbon in the SCR catalyst to completely vaporize or oxidize at lower temperatures (for example, less than 300-400° C.). As a result, large amounts of heat are generated, which drives the temperature of the SCR catalyst well above the exhaust temperature for a duration. As is shown in FIGS. 3 & 4, the temperatures within the SCR catalyst can reach 750-850° C. or even higher due to the release of heat from the urea deposit decomposition and other derived reactions, and/or hydrocarbon oxidation. Further, the urea deposits may also react with the SCR catalyst washcoat at a higher reaction rate at these elevated temperatures. These factors may cause degradation of the SCR catalyst washcoat, and therefore may harm catalyst performance.

Figure 5:
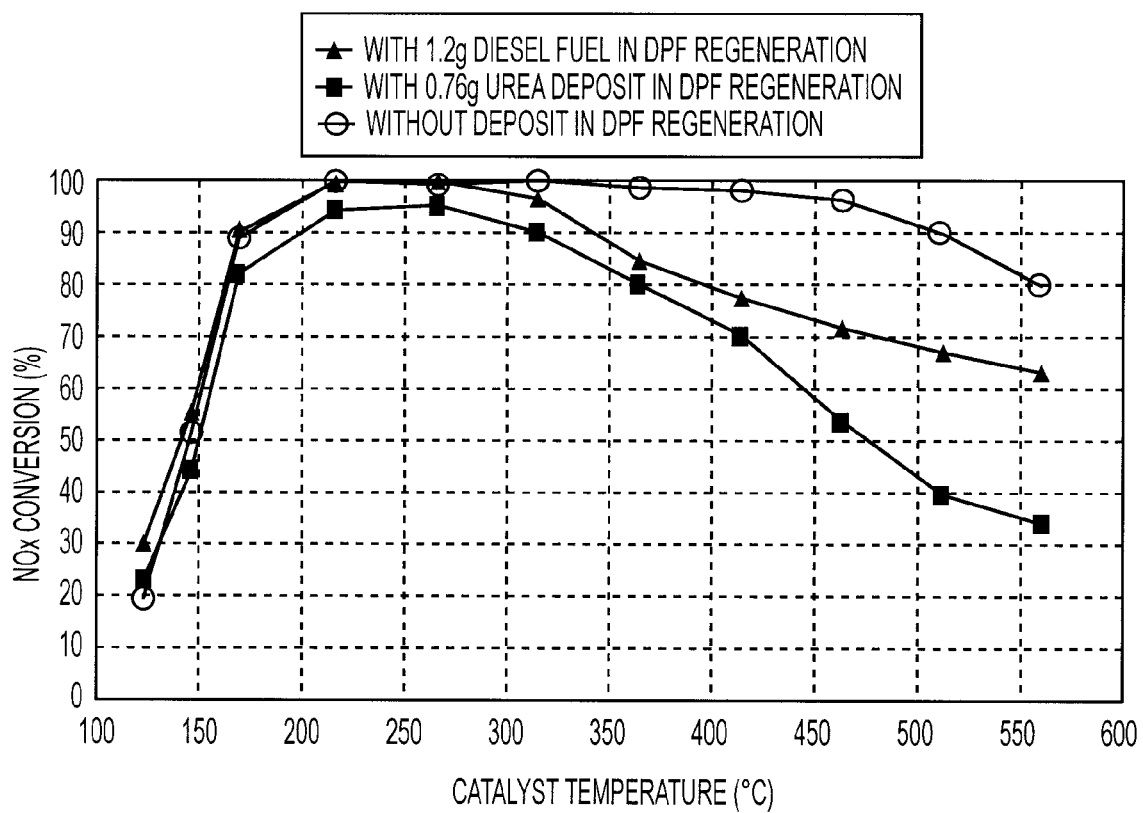
FIG. 5 shows a graph of NOx conversion efficiencies as a function of catalyst temperature for a base metal SCR catalyst with urea deposits, with stored diesel fuel and without any unwanted species (urea deposits and hydrocarbon, etc.) during a simulated particulate filter regeneration.

FIG. 5 shows a comparison of the NOx conversion efficiency versus temperature profiles of a base metal-zeolite SCR catalyst with 0.78 g per core of deposited urea and 1.2 gram per core diesel fuel and a similar SCR catalyst without any urea deposits or stored hydrocarbon when subjected to a laboratory-simulated particulate filter regeneration. From FIG. 5, it can be seen that the SCR catalyst with the urea deposit during particulate filter regeneration shows worse NOx conversion performance than the SCR catalyst with stored diesel fuel (large hydrocarbon) during particulate filter regeneration, which itself performs worse than the SCR catalyst without any deposit. Therefore, the high temperature spike caused by the presence of urea deposits (and/or the high reaction rates of the urea with the washcoat in the SCR catalyst) and/or the rapid burning of stored hydrocarbon during particulate filter regeneration may damage the SCR catalyst. Since hundreds of particulate filter regenerations may be performed during the lifetime of a vehicle, an SCR catalyst may become totally dysfunctional well before a vehicle completes its service life.

Figure 6:
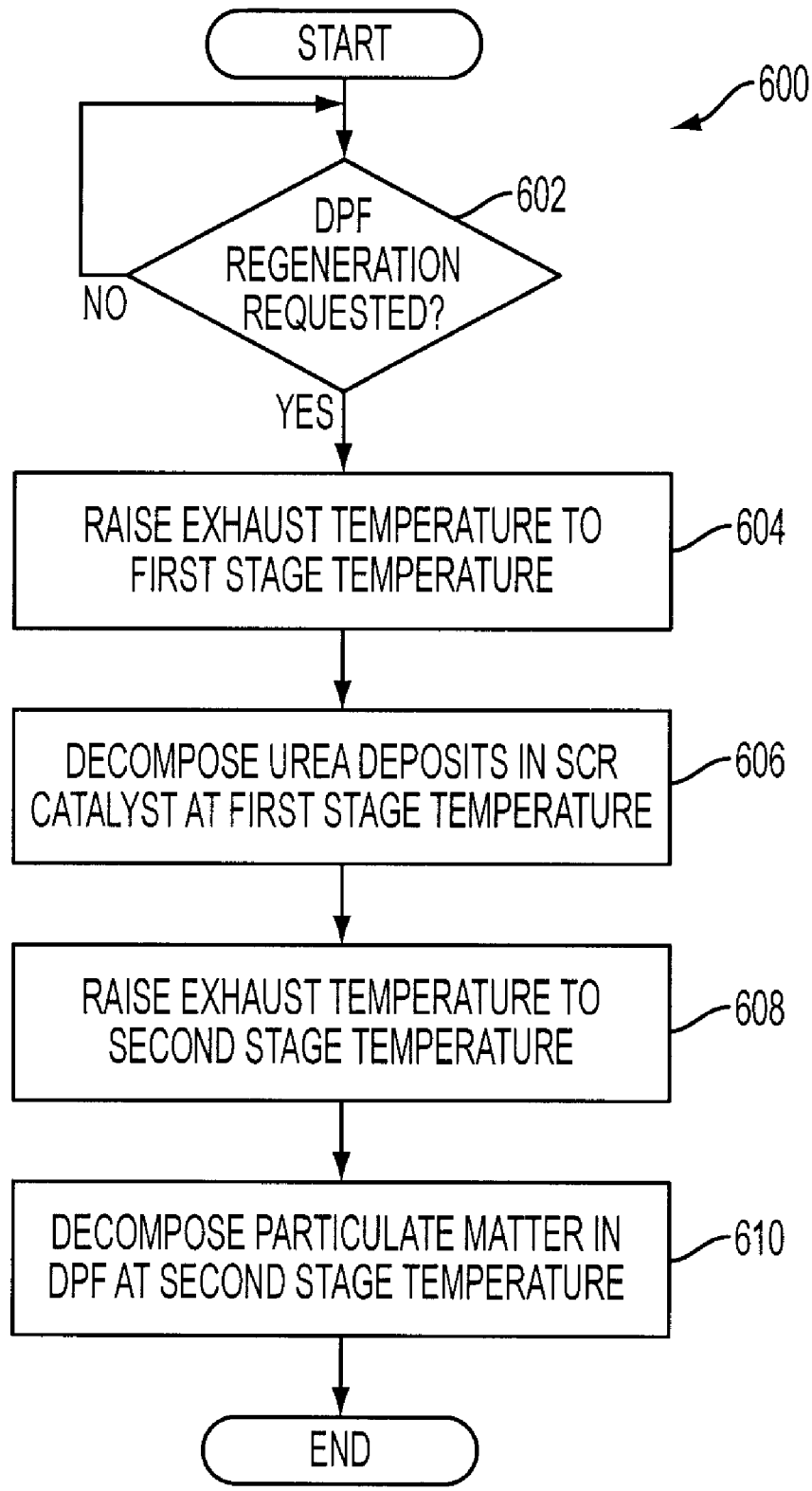
FIG. 6 shows a flow diagram of an embodiment of a method for regenerating a particulate filter.

To help to avoid potentially damaging an SCR catalyst during particulate filter regeneration, a multi-stage process may be used for particulate filter regeneration in which urea deposits and stored hydrocarbon are removed from the SCR catalyst at a lower temperature stage before the particulate filter is regenerated at a higher temperature stage. FIG. 6 shows a flow diagram depicting an exemplary embodiment of a method 600 of regenerating a particulate filter via a multi-stage process. Method 600 first comprises determining, at 602, whether a particulate filter regeneration process is requested. A regeneration process may be requested whenever controller 12 determines that one or more criteria regarding the particulate filter are met. For example, a regeneration process may be requested if a pressure differential across the particulate filter exceeds a predetermined amount. Likewise, controller 12 may track or calculate an estimated amount of particulate matter within the particulate filter based upon engine operating conditions, and may request regeneration when the estimated amount of particulate matter within the particulate filter exceeds a predetermined level.

If particulate filter regeneration is requested, method 600 comprises, at 604, raising the exhaust temperatures to a first elevated temperature configured to remove urea deposits and stored hydrocarbon from the SCR catalyst, thereby removing the deposits and hydrocarbon at 606. The exhaust temperature may be increased to any suitable value. Suitable values include values sufficient to heat the SCR catalyst to a temperature at which the rate of urea decomposition, and hydrocarbon vaporization and oxidation is greater than the rate at which the urea deposits and/or hydrocarbon stores on the SCR catalyst, thereby causing a net removal of deposited urea and stored hydrocarbon from the SCR catalyst, while not causing the temperature of the SCR catalyst to spike to potentially harmful levels due to urea decomposition and other derived reactions and stored hydrocarbon oxidation. It will be appreciated that suitable temperatures for the first stage may be dependent upon the materials employed in the catalyst and the specific chemistry of the catalyst. For a Fe-zeolite or a Cu-zeolite catalyst, suitable temperatures include, but are not limited to, exhaust and SCR catalyst temperatures in the range of approximately 300-450° C. The exhaust temperature may be held at the first elevated temperature for any suitable interval. Suitable intervals may differ depending upon an amount of urea deposited and hydrocarbon stored within the catalyst, as well has how fast the catalyst can be heated to the exhaust temperature by heat transfer from the exhaust gases. In some embodiments, the interval at which the exhaust is held at the first elevated temperature may be varied depending upon an estimated amount of urea deposited and hydrocarbon stored in the SCR catalyst. Generally, the duration of this interval is sufficient to remove a substantial portion of any urea deposits and stored hydrocarbon in the SCR catalyst such that the temperature of the SCR catalyst does not spike during heat up for a particulate filter regeneration process.

The estimated amount of urea deposited and the amount of hydrocarbon stored in the SCR catalyst may be tracked or calculated based upon engine operating variables, or determined in any other suitable manner. In these embodiments, if the estimated amount of urea deposited and/or hydrocarbon stored in the SCR catalyst is sufficiently low, the first heating stage may be shortened or omitted where suitable. Alternatively, the exhaust temperature may be held at the first elevated temperature for a fixed interval each time the particulate filter is regenerated. Again, this interval may be selected to be sufficient to remove a substantial portion of any urea deposits and or stored hydrocarbon within the SCR catalyst such that the temperature of the SCR catalyst does not spike to potentially damaging levels during particulate filter regeneration. For a Cu-zeolite or an Fe-zeolite catalyst with a volume of 1.5 liter, examples of suitable intervals include, but are not limited to, 0.5 to 10 minutes.

Continuing with FIG. 6, after decomposing the urea deposits and vaporizing or oxidizing the stored hydrocarbon in the SCR catalyst at the first elevated temperature, method 600 next comprises, at 608, raising the exhaust temperature to a second elevated temperature suitable for heating the particulate filter to a temperature at which trapped particulate matter can be decomposed, and then, at 610, decomposing or burning off the particulate matter to regenerate the particulate filter. The second elevated temperature may have any value suitable for regenerating the particulate filter. Suitable temperatures include, but are not limited to, exhaust and particulate filter temperatures between approximately 550-700° C.

While the specific embodiment of method 600 employs two heating stages, it will be appreciated that more than two heating stages may be employed in some embodiments. For example, the temperature of the SCR catalyst at the first heating stage may be approximately level during the first heating stage, or may be increased gradually or step-wise by control of the exhaust temperature during the first heating stage such that the rate at which urea and/or hydrocarbon is removed slowly increases as the mass of the deposited urea and/or hydrocarbon decreases. In such embodiments, the rate at which the SCR catalyst temperature increases during the first heating stage is generally lower than the rate at which the temperature is initially increased prior to the first interval and also lower than the rate at which the temperature is increased between the first and second intervals. For example, where a rate of heating before the urea deposit and/or hydrocarbon removal stage and between the urea deposit and/or stored hydrocarbon removal and particulate filter regeneration stages is 1.5-3.0° C./sec, a heating rate of approximately 0.1 to 1.0° C./sec may be used during the urea deposit removal stage.

It will be appreciated that the configurations and routines disclosed herein are exemplary in nature, and that these specific embodiments are not to be considered in a limiting sense, because numerous variations are possible. For example, the temperature ranges disclosed herein are merely exemplary, and other ranges may be suitable depending upon the specific physical and chemical properties of the SCR catalyst and particulate filter employed in specific embodiments. Furthermore, where other catalysts are positioned downstream of the SCR catalyst (such as a diesel oxidation catalyst), the methods described herein may also be used to remove any urea deposits and/or hydrocarbon stored that accumulate in these catalysts as well. The subject matter of the present disclosure includes all novel and nonobvious combinations and subcombinations of the various systems and configurations, and other features, functions, and/or properties disclosed herein. Further, while various theories may have been set forth herein, the approaches and systems set forth herein do not necessarily rely on the correctness of such theories.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. In an apparatus comprising an internal combustion engine, an exhaust system, a particulate filter disposed along the exhaust system, and an SCR catalyst that utilizes urea as reductant for NOx removal disposed along the exhaust system, a method of regenerating the particulate filter, comprising:

exposing the catalyst and particulate filter to a first, lower elevated exhaust temperature for an interval to heat the catalyst to remove one or more of urea deposits and stored hydrocarbon from the catalyst, the interval based upon an estimated amount of urea deposited and hydrocarbon stored in the catalyst;

increasing the temperature to a second, higher elevated exhaust temperature after removing a substantial portion of urea deposits and/or stored hydrocarbon from the catalyst; and exposing the catalyst and particulate filter to the second, higher elevated exhaust temperature to heat the particulate filter to remove particulate matter from the particulate filter.

2. The method of claim 1, wherein the first, lower elevated exhaust temperature is within a range of approximately 300-450 degrees Celsius.

3. The method of claim 1, wherein the second, higher elevated exhaust temperature is within a range of approximately 550-700 degrees Celsius.

4. The method of claim 1, wherein the internal combustion engine is a diesel engine.

5. The method of claim 1, wherein the interval is a first interval, and wherein the catalyst and particulate filter are exposed to the second, higher elevated exhaust temperature for a second interval, wherein the temperature of the exhaust is increased at a lower rate during the first interval than prior to the first interval or between the first and second intervals.

6. In an apparatus comprising an internal combustion engine, an exhaust system, a particulate filter disposed along the exhaust system, and an SCR catalyst disposed along the exhaust system, a method of regenerating the particulate filter, comprising:

estimating an amount of urea deposited and hydrocarbon stored in the SCR catalyst;

determining a length of a first interval based upon the estimated amount of urea deposit and stored hydrocarbon;

first removing at least some urea deposit and/or stored hydrocarbon from the SCR catalyst by heating the SCR catalyst to a temperature of between approximately 300-450 degrees Celsius for the first interval; and after removing at least some urea deposit and stored hydrocarbon from the SCR catalyst, removing particulate matter from the particulate filter by heating the particulate filter to a temperature of higher than approximately 550-700 degrees Celsius for a second interval.

7. The method of claim 6, wherein the engine is a diesel engine.

8. A method for an engine exhaust including an SCR-catalyst and a particulate filter (PF), comprising:

estimating an amount of urea deposited and hydrocarbon stored in the SCR-catalyst;

exposing the SCR-catalyst and PF to a first, lower elevated exhaust temperature for an interval to remove urea deposits and stored hydrocarbon based upon the estimated amount; and then exposing the catalyst and PF to a second, higher elevated exhaust temperature to regenerate particulates from the PF.

9. The method of claim 8, wherein the interval is shortened when the estimated amount is low.

* * * * *